(12) United States Patent
Rajpal et al.

(10) Patent No.: US 8,566,689 B2
(45) Date of Patent: Oct. 22, 2013

(54) DATA INTEGRITY UNITS IN NONVOLATILE MEMORY

(75) Inventors: Shiv K. Rajpal, Sammamish, WA (US); Vladimir Sadovsky, Redmond, WA (US); Robin A. Alexander, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 12/603,593

(22) Filed: Oct. 22, 2009

(65) Prior Publication Data

US 2011/0099461 A1    Apr. 28, 2011

(51) Int. Cl.
*G06F 11/10*    (2006.01)

(52) U.S. Cl.
USPC .............................. 714/807; 714/52; 714/54

(58) Field of Classification Search
USPC .............................................. 714/52, 54, 807
See application file for complete search history.

(56) References Cited

U.S. PATENT DOCUMENTS

| | | | |
|---|---|---|---|
| 6,928,607 B2* | 8/2005 | Loaiza et al. ................. | 714/807 |
| 6,964,008 B1* | 11/2005 | Van Meter, III .............. | 714/807 |
| 7,191,382 B2 | 3/2007 | James et al. | |
| 7,197,617 B2 | 3/2007 | Brant et al. | |
| 7,873,878 B2* | 1/2011 | Belluomini et al. ............. | 714/52 |
| 7,937,627 B2* | 5/2011 | Dawson et al. ................. | 714/54 |
| 2003/0026506 A1 | 2/2003 | Allison et al. | |
| 2003/0131291 A1* | 7/2003 | Morrison et al. ............... | 714/54 |
| 2004/0083333 A1* | 4/2004 | Chang et al. ................. | 711/103 |
| 2007/0192854 A1 | 8/2007 | Kelley et al. | |
| 2007/0226535 A1* | 9/2007 | Gokhale .......................... | 714/6 |
| 2008/0022187 A1 | 1/2008 | Bains | |
| 2008/0142580 A1 | 6/2008 | Seo | |
| 2008/0263259 A1 | 10/2008 | Sadovsky et al. | |
| 2009/0024899 A1* | 1/2009 | Reid .............................. | 714/758 |
| 2010/0318887 A1* | 12/2010 | Zvibel ........................... | 714/819 |
| 2011/0041031 A1* | 2/2011 | Ko et al. ....................... | 714/752 |

OTHER PUBLICATIONS

Fechner, Bernhard, "Analysis of Checksum-Based Execution Schemes for Pipelined Processors", Retrieved at <<http://ieeexplore.ieee.org/stamp/stamp.jsp?tp=&arnumber=1639664&isnumber=34366>>, 2006 IEEE, pp. 8.

Chen, et al., "Proceedings of the Java Virtual Machine Research and Technology Symposium", Retrieved at <<https://www.usenix.org/events/jvm01/full_papers/chen/chen.pdf>>, Monterey, California, USA, Apr. 23-24, 2001, pp. 12.

(Continued)

*Primary Examiner* — Philip Guyton
(74) *Attorney, Agent, or Firm* — Jared S. Goff (57) ABSTRACT

An integrity unit can be calculated from a first data unit, and a first storage device can be requested to store the first data unit. A second storage device, which can be separate from and/or a different type of device from the first storage device, can be requested to store metadata, which includes the integrity unit, in nonvolatile memory. Also, a second data unit can be received from the first storage device in response to a request for the first data unit. The integrity unit can be received from the second storage device, and the second data unit and the integrity unit can be analyzed to determine whether the second data unit matches the first data unit. Alternatively, a first integrity unit can be stored in a metadata region of a nonvolatile memory block, where the block also stores the data from which the first integrity unit was calculated.

20 Claims, 6 Drawing Sheets

(56) References Cited

OTHER PUBLICATIONS

Obr, et al., "Storage Optimization Across Media With Differing Capabilities", U.S. Appl. No. 12/432,338, filed Apr. 29, 2009, pp. 36.

"Working Draft Project American National Standard: Information technology—SCSI Block Commands—3 (SBC-3)", May 29, 2009, pp. 220 (i-xxii & 1-198), T10/1799-D.

* cited by examiner

SOFTWARE 180 IMPLEMENTING DATA INTEGRITY
UNITS IN NONVOLATILE MEMORY

DATA INTEGRITY UNITS IN NONVOLATILE MEMORY

BACKGROUND

In computing, silent data corruption is the problem of receiving corrupted data from a storage device, such as a hard disk drive, where the operating system and/or application receiving the data is unaware of the fact that the integrity of the received data has been compromised. As used herein, a "storage device" is a device used to store data in a computing system, and can include devices such as hard disk drives, solid state drives, smart cards, floppy drives, etc. A storage device may be a logical drive, which can be spread across multiple physical drives and/or take up only a portion of a physical drive. Corruption of the data could happen due to one or more problems, such as transmission errors over a physical link to storage device, or a bug in firmware on the storage device.

Computing systems have implemented techniques to discover corrupt data that is received from a storage device. For example, an operating system may compute a checksum, such as a cyclical redundancy check (CRC), for each block written to a hard disk drive storage device. The checksum can be kept in volatile system memory. Alternatively, the operating system may pass the checksum to the hard disk drive as metadata for each block along with each data write request. As yet another alternative, the operating system may store data on one hard disk drive, and store checksums for the data on a separate hard disk drive.

Upon receiving the data back from the storage device in response to a read request, the operating system can compute a new checksum from the received data. The new checksum can be compared to the previously-stored checksum. The two checksums indicate data integrity (i.e., that there was no corruption of the data) if the checksums match (i.e., they are the same to the extent they are expected to be the same to validate data integrity).

SUMMARY

Embodiments described herein are directed to techniques and tools for improved data integrity checking using integrity units, and specifically to improved ways of storing integrity units in nonvolatile memory. The term "integrity unit" is used herein broadly to refer to a unit of information that can be stored and used later to check the validity of data. For example, an integrity unit may include one checksum calculated from stored data. Also, an integrity unit may include multiple sub-units, such as multiple checksums calculated from stored data. An integrity unit can be included with other metadata. As used herein, metadata is data that relates to other data. For example, metadata for a set of data may include an integrity unit corresponding to the data, as well as other metadata for diagnosing and/or correcting data errors related to the set of data. As used herein, nonvolatile memory refers to nonvolatile solid state storage devices. Examples of such memory include, but are not limited to, solid state drives, block addressable flash memory on a system bus such as the peripheral component interconnect (PCI) bus, and word addressable nonvolatile solid state memory such as phase change memory.

In one embodiment, the tools and techniques can include calculating an integrity unit from an original data unit. A first storage device can be requested to store the original data unit. A second storage device, which can be separate from the first storage device, can be requested to store metadata, which can include the integrity unit, in nonvolatile memory. A data unit can be received from the first storage device in response to a request for the first data unit. The integrity unit can be received back from the second storage device, and the received data unit and the received integrity unit can be analyzed to determine whether the received data unit matches the original data unit. For example, another integrity unit can be calculated from the received data unit, and that integrity unit can be compared with the received integrity unit.

In another embodiment of the tools and techniques, a first integrity unit can be calculated from a first data unit. A first storage device can be requested to store the first data unit. A second storage device, which can be a different type of storage device from the first storage device, can be requested to store metadata in nonvolatile memory. The metadata can include the integrity unit. A second data unit can be received from the first storage device in response to a request for the first data unit, and a second integrity unit can be calculated from the second data unit. The first integrity unit can be received from the second storage device, and it can be determined whether the second integrity unit matches the first integrity unit.

In yet another embodiment of the tools and techniques, a first integrity unit can be calculated from a first data unit, and a storage device can be requested to store the first data unit in a data region of a nonvolatile memory block. The storage device can also be requested to store metadata, which can include the integrity unit, in a metadata region of the nonvolatile memory block. Additionally, a second data unit can be received from the storage device in response to a request for the first data unit, and a second integrity unit can be calculated from the second data unit. The first integrity unit can be received from the storage device, and it can be determined whether the second integrity unit matches the first integrity unit.

Diagnostic information, such as details of physical topology and the path (such as the input-output, or I/O, path) taken to store the data, may be calculated and stored along with the integrity unit. If an integrity violation is detected (e.g., where the integrity units calculated from the original and received data do not match), such diagnostic information can be retrieved and used to optimize troubleshooting and diagnosis of the storage system This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Problems exist with prior data integrity checking techniques, and in particular with the ways that data integrity units have been stored. For example, where the data integrity units are kept in volatile system memory, at least two problems may arise. First, volatile system memory for storing data integrity units may not scale with the size of hard disk drives increasing over the years. As an example, for a 120 G hard disk drive, 60 MB of memory may be needed to store 4 bytes of checksum per block. This can be a large consumption of pages in the system memory. Second, if the integrity units are in volatile system memory, they can be lost on system reboot or power loss. Thus, the checksums may need to be re-computed on each reboot. Such re-computations can impact performance, and there is a chance some data corruption will go undetected because the checking technique relies on the data on disk being un-corrupted each time the system reboots.

Where the operating system passes the checksum to the hard disk drive as metadata for each block along with each data write request, non-standard block sizes are produced by combining the checksums with the data. Thus, the operating system may need to be equipped for specialized handling of input-output to send the non-standard block size for the input-output requests. Also, specialized input-output controllers may be needed to handle the non-standard block sizes.

Where the operating system stores data on a separate hard disk drive from the corresponding checksums, performance can be adversely impacted because of the large latency of seek operations that can result from writing to and reading from both hard disk drives.

In contrast with such prior techniques, the tools and techniques described herein include storing data integrity units in nonvolatile memory. For example, when data is stored on one storage device, corresponding data integrity units can be stored in nonvolatile memory on a separate storage device, and the two storage devices may be different types. In one implementation, the data may be stored in a magnetic storage device such as a hard disk drive, and the corresponding data integrity units can be stored in a separate nonvolatile memory device, such as a phase change memory device. As another example, data may be stored in a data region of a nonvolatile memory block, and a data integrity unit for that data may be stored in a metadata region of that same memory block. Storing the checksums in ways such as these can allow for an improved balance between data integrity and performance. This may be done at least in part because of the characteristics of nonvolatile memory, which can include low latency for random access (reducing the seek time problems discussed above), non-volatility (reducing problems discussed above from loss of data in volatile memory), and/or relatively large capacity as compared to DRAM (reducing problems discussed above from limited volatile system memory).

Accordingly, one or more substantial benefits can be realized from the tools and techniques described herein. The various techniques and tools described herein may be used separately or in combination to produce such benefits. However, the subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show the various ways in which particular techniques can be used in conjunction with other techniques.

I. Exemplary Computing Environment

Figure 1:
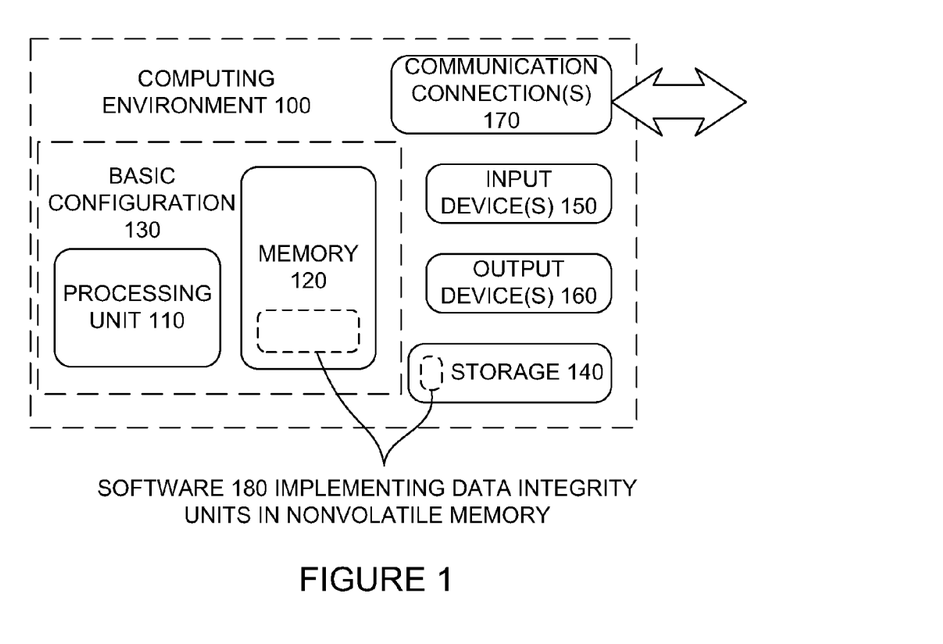
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can store and use data and corresponding integrity units as discussed in more detail below. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), nonvolatile memory (e.g., ROM, EEPROM, flash memory, phase change memory), or some combination of the two. The memory (120) stores software (180) implementing data integrity units in nonvolatile memory.

Although the various blocks of FIG. 1 are shown with lines for the sake of clarity, in reality, delineating various components is not so clear and, metaphorically, the lines of FIG. 1 and the other figures discussed below would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be internal or external (i.e., inside or outside a main host system), and removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity (as illustrated by the double arrow extending from the illustration of communication connection(s) (170)). Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable storage media. Computer-readable storage media are any available media that can be accessed within a computing environment. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

Figure 2:
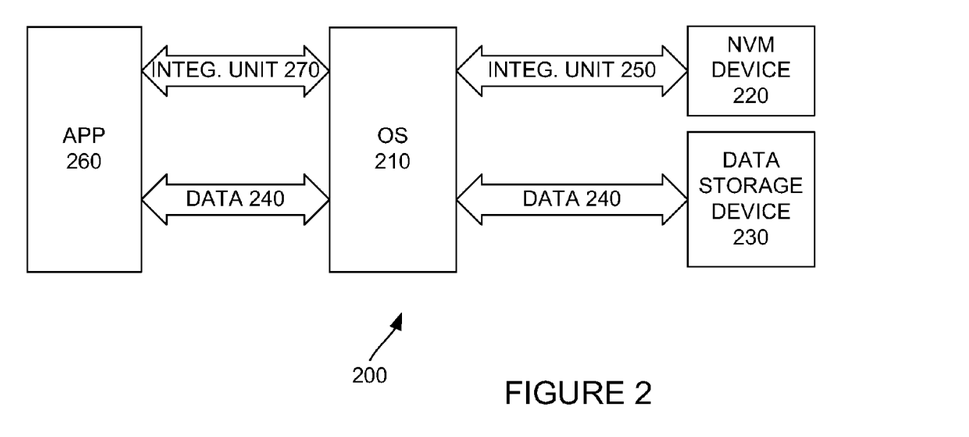
FIG. 2 is a block diagram of a nonvolatile memory data integrity unit storage environment.

II. System and Environment for Storing Data Integrity Units in Nonvolatile Memory Devices and Data in Data Storage Devices FIG. 2 is a block diagram of a nonvolatile memory data integrity unit storage environment (200) in conjunction with which one or more of the described embodiments may be implemented. The environment (200) can have computing components similar to those discussed above with reference to FIG. 1. The environment (200) can include an operating system (210), which can interact with a nonvolatile memory device (220) and with another separate data storage device (230), which can be a different type of device from the nonvolatile memory device (220). For example, the data storage device (230) could be a magnetic storage device such as a hard disk drive, a solid state storage device (which may be a different type of device from the nonvolatile memory device (220)), or some other type of storage device that can interface with the operating system (210).

The operating system (210) can instruct the data storage device (230) to store data (240), and the operating system (210) can request data (240) from the data storage device (230). The operating system (210) can also request that the nonvolatile memory device (220) store integrity units (250) calculated from the data (240), and can later request those integrity units (250) from the nonvolatile memory device (220) to check the integrity of corresponding data (240) received from the data storage device (230). Such corresponding data (240) may be data (240) that is received in response to requests for data that was earlier sent to the data storage device (230) for storage.

For example, when the operating system (210) requests that data be stored in the data storage device (230), an integrity module in the operating system (210) (such as a multi-pathing driver, a disk driver, or a separate module in the operating system (210)) can calculate an integrity unit from the data (240), and can request that the integrity unit (250) be stored in the nonvolatile memory device (220). Later, when the operating system (210) requests from the data storage device (230) corresponding data (240) that is expected to match the data (240) previously requested to be stored (e.g., where the corresponding data is returned in response to a request for the previously-stored data), an integrity module in the operating system (210) can also request the corresponding stored integrity unit (250) (which was calculated from the previously-stored data) from the nonvolatile memory device (220). The integrity module can also calculate a new integrity unit from the data (240) received back from the data storage device (230). The integrity module of the operating system (210) can compare the stored integrity unit (250) received from the nonvolatile memory device with the new integrity unit. If the two integrity units match, this indicates that the data received from the data storage device (230) matches the data originally sent to the data storage device (230), which is what the operating system (210) expects. Accordingly, a match between the two integrity units can indicate integrity of the data (240) received back from storage.

If the two integrity units do not match, this can indicate a lack of integrity in the data (240) received back from the data storage device (230), where we assume nonvolatile memory device (220) has a higher reliability rating than the data storage device (230). Accordingly, when this happens, the operating system (210) can take one or more appropriate actions, such as attempting to repair the received data, notifying a user and/or a requesting application of the lack of integrity, logging facts about the mismatch, etc. This can be done using diagnostic information stored as metadata along with the integrity unit (250). For example, the operating system (210)

may log information about the data storage device (230) and a path that the data (240) took to and from the data storage device (230). That path information may be stored as metadata along with the integrity unit (250) on the nonvolatile memory device (220). If there are multiple paths to a data storage device (230), and one of those paths results in repeated data integrity problems, the operating system (210) may reroute future data storage requests to the data storage device (230) through one or more other paths. The operating system (210) may also notify a user of a path and/or storage device that repeatedly produces data integrity problems. This could help in troubleshooting storage-related problems with the computing environment (200).

Referring still to FIG. 2, the environment can include an application (260), which can be an application that requests the operating system (210) to store the data (240). In addition to or instead of the operating system (210) calculating an integrity unit to be stored in the nonvolatile memory device (220), the application (260) can calculate an integrity unit (270). The application can send the application-calculated integrity unit (270) to the operating system (210), such as via a defined operating system application programming interface. The operating system (210) may combine the application-calculated integrity unit (270) and an integrity unit calculated by the operating system (210) into a combined integrity unit (250) that can be stored in the nonvolatile memory device (220), as discussed above.

When the application (260) requests that the operating system (210) retrieve the data (240) from storage, the application (260) can also request the integrity unit (270). The operating system (210) can request the combined integrity unit (250) from the nonvolatile memory device (220), and can request the data (240) from the data storage device (230). Upon receiving the combined integrity unit (250) and the data (240), the operating system (210) can calculate a new integrity unit from the received data (240) and can compare that new integrity unit with the stored integrity unit, which was previously calculated by the operating system (210) and was received back as part of the combined integrity unit (250). The operating system (210) can also pass the data (240) and the application-calculated integrity unit (270) from the combined integrity unit (250) to the application (260). The application (260) can calculate a new integrity unit from the received data, and can compare the new application-calculated integrity unit with the application-calculated integrity unit received back from the operating system (210). The application (260) can then take appropriate action depending on whether the two application-calculated integrity units match. The application (260) can send and receive integrity units (250) to and from the operating system (210) by making application programming interface calls or in some other manner. Integrity mismatches may happen independently at the operating system level or the application level. Mismatches at these different levels may generate different actions. For instance, an operating system action in response to an integrity mismatch may be to report failed input-output, while an application action may be to trigger a user visible error message.

Of course, the configuration of FIG. 2 could be used without having an application outside the operating system (210) calculate its own integrity unit. Additionally, integrity units could be calculated and compared by one or more other components outside the operating system instead of, or in addition to, having an operating system component calculate and compare the integrity units.

III. System and Environment for Data Integrity Units in Metadata Regions of Nonvolatile Memory Blocks Referring now to FIG. 3, a computing environment (300) for storing data integrity units in metadata regions of nonvolatile memory blocks will be described. The environment (300) can have computing components similar to those discussed above with reference to FIG. 1. The computing environment (300) can include a main host (305), which can host an operating system (310) and an input/output (I/O) controller (320). The I/O controller (320) can control transmission of data and metadata (325) between the operating system (310) and one or more storage devices, such as a nonvolatile memory device (330). For example, the I/O controller (320) may be a host bus adapter.

Figure 3:
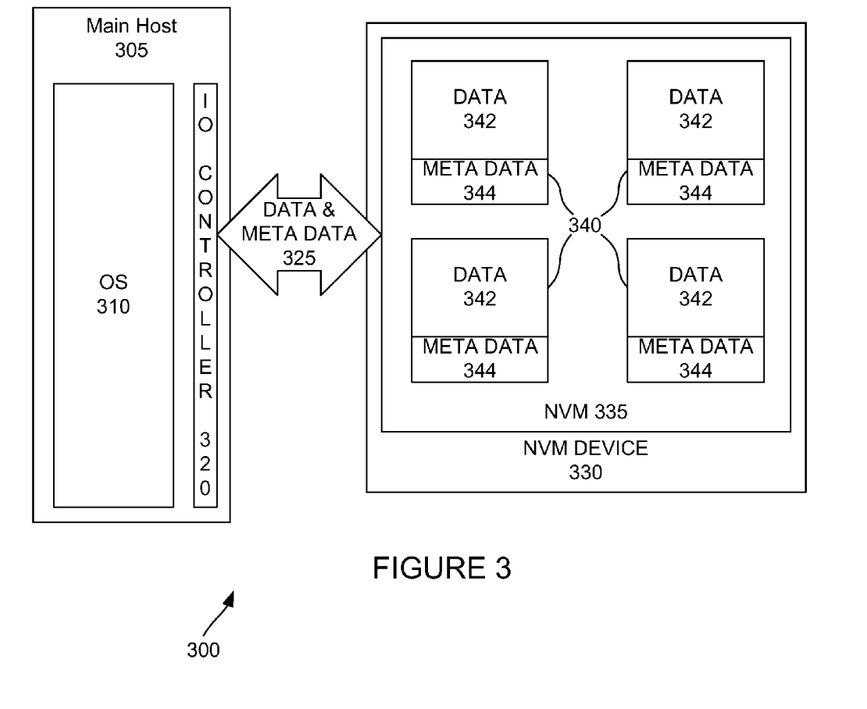
FIG. 3 is a block diagram of another nonvolatile memory data integrity unit storage environment.

The nonvolatile memory device (330) can include one or more nonvolatile memory media (335), which can be organized into storage blocks (340). Each storage block (340) can include a data region (342) and a metadata region (344). Metadata regions (344) of nonvolatile memory blocks (340) are typically not available to operating systems to store information. Instead, they are reserved for use in storing metadata that is specific to the nonvolatile memory device (330). However, the interface with the nonvolatile memory device (330) can be extended to allow a component, such as an operating system component or an I/O controller (320), to store information in the metadata regions (344). Accordingly, the I/O controller (320) or a component of the operating system (310) can calculate an integrity unit from data to be stored in the nonvolatile memory device (330). The integrity unit can be passed to the nonvolatile memory device (330), along with the data and possibly other metadata. The metadata can be stored in a metadata region (344) of a block (340), and the corresponding data from which the integrity unit was calculated can be stored in the data region (342) of the same block (340).

Before initially using integrity units in the configuration of FIG. 3, the I/O controller (320) can report availability of the integrity unit storage feature. An operating system driver can then request a slot or offset in a metadata region (344) to be used for storing the integrity unit. If a slot or offset is not available, a controller interface may fail the operating system driver's request. If operating system level data integrity units are augmented with application level data integrity units (as discussed above with reference to FIG. 2), the slot requested in the metadata region (344) can be requested as the sum of the individual integrity units. An operating system driver can expose a programmatic interface, enabling the operating system (310) and applications (not shown) to indicate sizes of the individual integrity units.

When the data is later requested by the I/O controller (320), the metadata (including the stored integrity unit) can be sent along with the data. If the I/O controller (320) is acting as an integrity module, the I/O controller can calculate a new integrity unit from the received data and compare that new integrity unit to the stored integrity unit received from the nonvolatile memory device (330). The information from this comparison can be used as discussed above. For example, if the two integrity units match, this can indicate a match between the data that was originally sent to the nonvolatile memory device (330) and the data that was received back from the nonvolatile memory device (330).

This configuration can be more efficient than other configurations where integrity units for data in multiple blocks (340) of a device are stored in the data region of another block (340). In those configurations, an operating system (310) can request the data from one block, and can also request the corresponding integrity unit from another block, typically resulting in two requests being sent and two blocks being read for each block of data that is requested from a block-based storage device. In contrast, where the integrity unit and the data itself are in the same block (340) they can be requested in a single request, and returned in a single response as a single block.

IV. Techniques for Data Integrity Units in Nonvolatile Memory

Techniques for data integrity units in nonvolatile memory will now be discussed. These techniques can be performed in one or more computing environments such as those discussed above, or some other computing environment(s).

Figure 4:
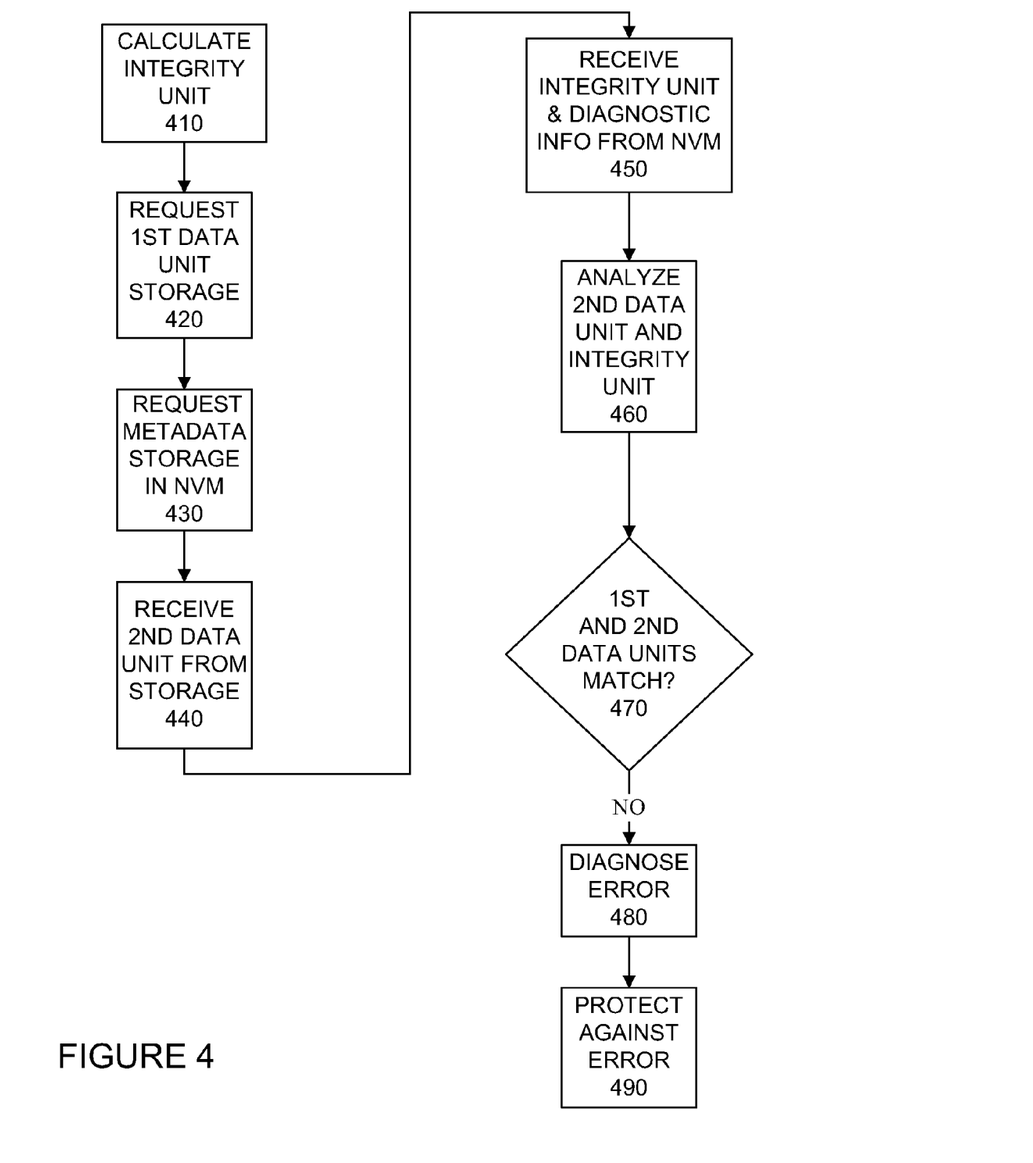
FIG. 4 is a flowchart illustrating a technique for data integrity units in nonvolatile memory.

Referring to FIG. 4, a technique for data integrity units in nonvolatile memory will be discussed. In the technique, an integrity unit calculated from a first data unit can be calculated (410). A first storage device can be requested (420) to store the first data unit in the storage device. In addition, a second storage device can be requested (430) to store metadata in nonvolatile memory in the second storage device. The metadata can include the integrity unit, and may also include diagnostic information, such as information about a path of the first data unit to the first storage device. Also, the second storage device can be separate from the first storage device. A second data unit can be received (440) from the first storage device in response to a request for the first data unit. For example, the second data unit may be a data unit that is expected to be the same as the first data unit. The integrity unit, and optionally also diagnostic information such as data path information, can be received (450) for the second storage device in response to a request. The second data unit and the integrity unit can be analyzed (460) to determine (470) whether the second data unit matches the first data unit. For example, the integrity unit can be a first integrity unit, and analyzing (460) can include calculating a second integrity unit from the second data unit and comparing the second integrity unit with the first integrity unit. One or more of the operations of FIG. 4 can be performed by one or more computing components comprising an operating system component.

The first and second storage devices may be different types of storage devices. For example, the first storage device can include one or more magnetic storage media, such as one or more hard disks. The nonvolatile memory can be, for example, a solid state drive memory, block addressable flash memory on a system bus, phase change memory, or some combination of the foregoing types of nonvolatile memory. The nonvolatile memory may be word addressable, and the integrity unit can be stored on the nonvolatile memory as part of an array of integrity units. The integrity unit can be indexed on the array by an address (such as a logical block address) of the first data unit in the first storage device. Alternatively, mapping tables could be used to locate integrity units in word addressable nonvolatile memory.

The integrity unit may be a first checksum, and analyzing the second data unit and the integrity unit can include calculating a second checksum from the second data unit and determining whether the two checksums match. The diagnostic information received from the second storage device can be analyzed to diagnose (480) an error if the second data unit does not match the first data unit. The diagnostic information can also be used to protect (490) against the error, such as by re-routing future data to avoid an error-prone data path. For example, the diagnostic information may include information about a path of the first data unit to the first storage device. The method can include receiving the information about the path from the second storage device.

Figure 5:
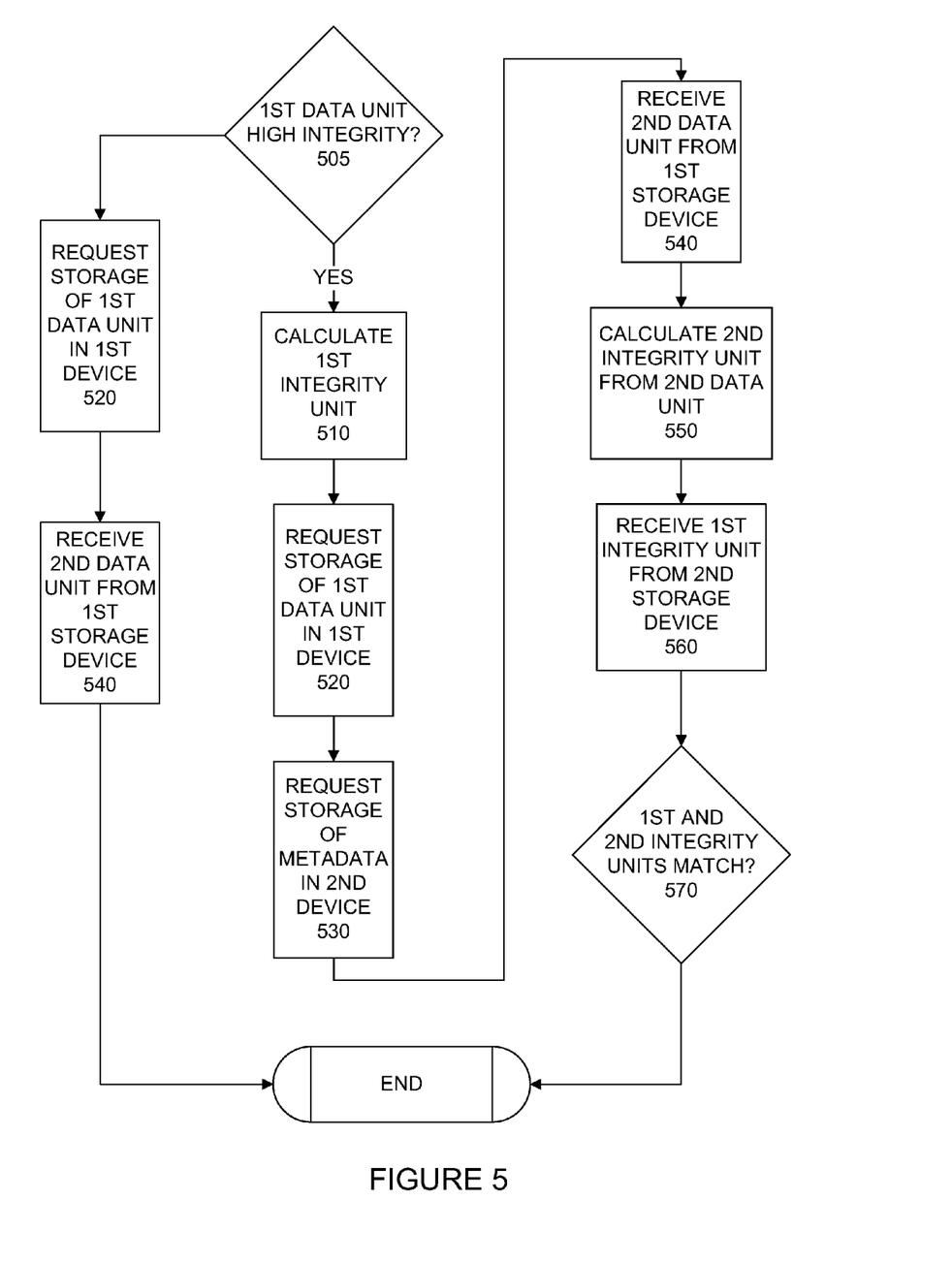
FIG. 5 is a flowchart illustrating another technique for data integrity units in nonvolatile memory.

Referring now to FIG. 5, another technique for data integrity units in nonvolatile memory will be discussed. In the technique, it can be determined (505) whether a first data unit, which is to be stored, is a high integrity unit. "High integrity" is an attribute of stored data indicating an intent to heighten integrity of the stored data, such as an attribute requested by an application or user. As an example, the determination (505) may be done by determining whether the first data unit is part of a high integrity directory in a file system, determining whether the first data unit is to be stored in a high integrity region (e.g., a block or group of blocks) of a storage device, determining whether the first data unit is part or all of a high integrity type of file, etc. If the first data unit is a high integrity unit, a number of operations can be performed. A first integrity unit can be calculated (510) from the first data unit. A first storage device can be requested (520) to store the first data unit. A second storage device can be requested (530) to store metadata in nonvolatile memory in the second storage device. The metadata can include the integrity unit. The first and second storage devices can be different types of storage devices. A second data unit can be received (540) from the first storage device in response to a request for the first data unit. A second integrity unit can be calculated (550) from the second data unit. The first integrity unit can be received (560) from the second storage device, and it can be determined (570) whether the first and second integrity units match.

If it is determined (505) that the first data unit is not a high integrity unit, then storage of the first data unit in the first device can be requested (520) and the second data unit can be received (540) from the first storage device, without performing the integrity operations (510, 530, 550, 560, and 570) discussed above with reference to FIG. 5. However, the integrity and storage operations (510, 520, 530, 540, 550, 560, and 570) may be performed without determining (505) whether the first data unit is a high integrity unit.

One or more operating system components can be executed to perform one or more of the operations discussed above with reference to FIG. 5. Also, the first type of storage device can be a magnetic-type storage device, such as a hard disk drive.

The technique of FIG. 5 may include additional operations associated with an application, such as receiving a third integrity unit from the application, including the third integrity unit in the metadata, receiving the third integrity unit from the second storage device, and passing the third integrity unit and the second data unit to the application.

Figure 6:
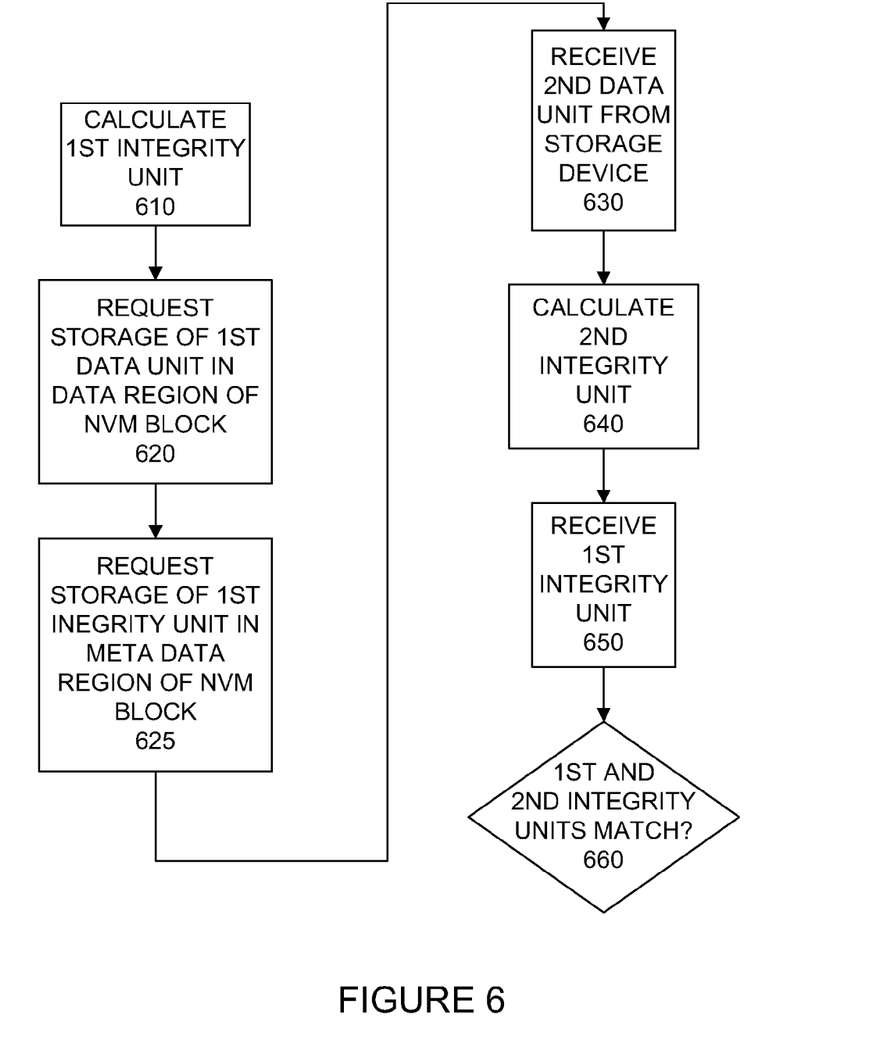
FIG. 6 is a flowchart illustrating yet another technique for data integrity units in nonvolatile memory.

Referring now to FIG. 6, yet another technique for data integrity units in nonvolatile memory will be discussed. In the technique, a first integrity unit can be calculated (610) from a first data unit. A storage device can be requested (620) to store the first data unit in a data region of a nonvolatile memory block in the storage device. The storage device can also be requested (625) to store metadata in a metadata region of the nonvolatile memory block. The metadata can include the first integrity unit. A second data unit can be received (630) from the storage device in response to a request for the first data unit. A second integrity unit can be calculated (640) from the second data unit, and the first integrity unit can be received (650) from the storage device. It can be determined (660) whether the second integrity unit matches the first integrity unit.

The operations discussed above with reference to FIG. 6 can be performed by one or more computing components, such as an operating system component. Alternatively, the instructions can be performed by a host adapter or some combination of a host adapter and an operating system component. In the latter case, negotiation of integrity functionality can be performed, for example, during initialization of the host adapter by an operating system driver. If both are capable of performing integrity validation, the operating system driver can make an arbitration decision and inform the host adapter via a defined interface.

The first and second integrity units can each include a checksum, such a cyclical redundancy check. Also, the first integrity unit can include one or more sub-units. For example, the first integrity unit may include one sub-unit calculated by a host adapter or operating system component and another sub-unit calculated by an application, as discussed above with reference to FIG. 2. Thus, at least one of the sub-units could be received from an application along with the first data unit and/or passed to the application along with the second data unit.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
    calculating a first integrity unit from a first data unit, the calculating being done outside of an application;
    requesting a first storage device to store the first data unit;
    receiving a second integrity unit from the application;
    requesting a second storage device to store metadata in nonvolatile memory in the second storage device, the metadata comprising the first integrity unit and the second integrity unit, and the second storage device being separate from the first storage device;
    receiving a second data unit from the first storage device in response to a request for the first data unit;
    calculating a third integrity unit from the second data unit;
    receiving the first integrity unit from the second storage device in response to requesting the first integrity unit from the second storage device;
    determining whether the third integrity unit matches the first integrity unit;
    receiving the second integrity unit from the second storage device; and
    passing the second integrity unit and the second data unit to the application.

2. The method of claim 1, wherein the first storage device is a first type of storage device and the second storage device is a second type of storage device.

3. The method of claim 1, wherein the nonvolatile memory is word addressable, and wherein the first integrity unit is stored on the nonvolatile memory as part of an array of integrity units.

4. The method of claim 3, wherein the first integrity unit is indexed in the array by an address of the first data unit in the first storage device.

5. The method of claim 1, wherein the first integrity unit is a first checksum, and wherein analyzing the second data unit and the first integrity unit comprises:
    calculating a second checksum from the second data unit; and
    determining whether the second checksum matches the first checksum.

6. The method of claim 5, wherein:
    the first storage device comprises one or more magnetic storage media;
    the nonvolatile memory is selected from a group consisting of a solid state drive, block addressable flash memory on a system bus, and phase change memory; and
    calculating the first integrity unit, requesting the first storage device to store the first data unit, requesting the second storage device to store the metadata, receiving the second data unit, receiving the first integrity unit, receiving the second integrity unit from the application, receiving the second integrity unit from the second storage device, passing the second integrity unit and the second data unit to the application, and analyzing the second data unit and the first integrity unit are performed by one or more computing components comprising an operating system component.

7. The method of claim 1, wherein the metadata further comprises diagnostic information for the first data unit, and wherein the method further comprises:
    receiving the diagnostic information from the second storage device; and
    analyzing the diagnostic information to diagnose an error if the second data unit does not match the first data unit.

8. The method of claim 7, wherein the method further comprises using the diagnostic information to protect against the error.

9. The method of claim 8, wherein the diagnostic information is information about a path of the first data unit to the first storage device, and wherein protecting against the error comprises taking an action selected from a group consisting of rerouting one or more future data storage requests, notifying a user of the error, and combinations thereof.

10. The method of claim 1, wherein the metadata further comprises information about a path of the first data unit to the first storage device, and wherein the method further comprises receiving from the second storage device the information about the path.

11. The method of claim 1, wherein calculating the first integrity unit, requesting the first storage device to store the first data unit, requesting the second storage device to store the metadata, receiving the second data unit, receiving the first integrity unit, receiving the second integrity unit from the application, receiving the second integrity unit from the second storage device, passing the second integrity unit and the second data unit to the application, and analyzing the second data unit and the first integrity unit are performed by one or more computing components comprising an operating system component.

12. The method of claim 1, further comprising determining that the first data unit is a high integrity storage unit, wherein requesting the second storage device to store the metadata in the nonvolatile memory in the second storage device is performed in response to determining that the first data unit is a high integrity storage unit.

13. Computer-readable storage hardware having computer-executable instructions embodied thereon that, when executed by at least one processor, cause the at least one processor to perform acts comprising:
    calculating a first integrity unit from a first data unit;
    receiving a second integrity unit from an application;
    requesting a first storage device to store the first data unit in the first storage device;
    requesting a second storage device to store metadata in nonvolatile memory in the second storage device, the metadata comprising the first integrity unit and the second integrity unit, and the second storage device being separate from the first storage device;
    receiving a second data unit from the first storage device in response to a request for the first data unit;

calculating a third integrity unit from the second data unit;
receiving the first integrity unit from the second storage device;
determining whether the third integrity unit matches the first integrity unit;
receiving the second integrity unit from the second storage device; and
passing the second integrity unit and the second data unit to the application.

14. The computer-readable storage hardware of claim 13, wherein the acts further comprise determining that the first data unit is a high integrity storage unit before requesting the second storage device to store the metadata.

15. The computer-readable storage hardware of claim 13, wherein the first storage device is a first type of storage device and the second storage device is a second type of storage device that is different from the first type of storage device.

16. The computer-readable storage hardware of claim 13, wherein the computer-executable instructions comprise one or more operating system components.

17. The computer-readable storage hardware of claim 13, wherein the calculating of the first integrity unit is done outside of the application.

18. A computer system comprising:
at least one processor; and
a memory comprising instructions stored thereon that when executed by the at least one processor cause the at least one processor to perform acts comprising:
requesting a first storage device to store a first data unit in the first storage device, the first storage device being a first type of storage device;
determining whether the first data unit is a high integrity storage unit;
receiving a second data unit from the first storage device in response to a request for the first data unit;
if the first data unit is a high integrity storage unit, then performing the following acts:
calculating a first integrity unit from the first data unit;
receiving a third integrity unit from an application;
requesting a second storage device to store metadata in nonvolatile memory in the second storage device, the metadata comprising the first integrity unit, the third integrity unit, and diagnostic information for the first data unit, and the second storage device being a second type of storage device that is different from the first type of storage device;
calculating a second integrity unit from the second data unit;
receiving the first integrity unit and the third integrity unit from the second storage device; and
determining whether the second integrity unit matches the first integrity unit;
if the second integrity unit matches the first integrity unit, then passing the third integrity unit and the second data unit to the application;
if the second integrity unit does not match the first integrity unit, then the acts further comprise:
receiving the diagnostic information from the second storage device; and
analyzing the diagnostic information to diagnose an error if the second data unit does not match the first data unit.

19. The computer system of claim 18, wherein, if the first data unit is not a high integrity storage unit, then the acts do not include requesting the second storage device to store metadata comprising the first integrity unit.

20. The computer system of claim 18, wherein the instructions comprise one or more operating system components.

\* \* \* \* \*